(12) United States Patent
Ronström

(10) Patent No.: US 6,249,788 B1
(45) Date of Patent: Jun. 19, 2001

(54) STRUCTURE FOR A DATABASE

(75) Inventor: Ulf Mikael Ronström, Örnbacken (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/115,947

(22) Filed: Jul. 15, 1998

(30) Foreign Application Priority Data

Jul. 21, 1997 (SE) .................................................. 97 02761

(51) Int. Cl.$^7$ .................................................. G06F 17/30
(52) U.S. Cl. .............................. 707/101; 707/2; 707/100; 707/103
(58) Field of Search .................................. 707/100, 101, 707/2, 103

(56) References Cited

U.S. PATENT DOCUMENTS

| | | | |
|---|---|---|---|
| 5,151,697 | * 9/1992 | Bunton | 341/51 |
| 5,307,486 | * 4/1994 | Nakamigawa | 707/2 |
| 5,404,505 | * 4/1995 | Levinson | 707/10 |
| 5,475,837 | * 12/1995 | Ishak et al. | 707/101 |
| 5,495,609 | * 2/1996 | Scott | 707/8 |
| 5,497,485 | * 3/1996 | Ferguson et al. | 707/1 |
| 5,649,023 | * 7/1997 | Barbara et al. | 382/159 |
| 5,701,468 | * 12/1997 | Benayoun et al. | 707/101 |
| 5,734,381 | * 3/1998 | Yoshizawa et al. | 345/352 |
| 5,758,356 | * 5/1998 | Hara et al. | 707/202 |
| 5,842,196 | * 11/1998 | Agarwal et al. | 707/2 |
| 5,842,197 | * 11/1998 | Ho | 707/2 |
| 6,067,574 | * 5/2000 | Tzeng | 709/247 |

OTHER PUBLICATIONS

Anestis A. Toptsis, "B$^{**}$–tree: A data organization Method for high storage utilization", IEEE, pp. 277–281, Jan. 1993.*

Santana et al., "The infinite distance in the determination of the nearest euclidean M–neighbours in the K–D–B Tree", IEEE, pp. 146–152, Jan. 1989.*

* cited by examiner

*Primary Examiner*—Kim Vu
*Assistant Examiner*—Jean M. Corrielus
(74) *Attorney, Agent, or Firm*—Burns, Doane, Swecker & Mathis L.L.P.

(57) ABSTRACT

The system relates to a structure for the storage of data-information within a data-base, which information is structured into a hierarchy of nodes and which hierarchy consists in a tree-structure. This tree-structure has a root-node (1), possibly one or several intermediate nodes (2, 3) and one or more leaf-nodes (4), wherein the root-node (1) comprises one or more root-elements (1E), wherein respective intermediate nodes (2, 3) include one or more intermediate elements (2E1, 2E2, 2E3, . . . ), and wherein respective leaf-nodes (4) include one or more leaf-elements (4E1, 4E2, 4E3, . . . ). Respective elements include the address information necessary to hold the tree-structure together and enable searches to be performed in the tree and data-information. The order of the elements within a node is a logical order concerning the data-information, such as a numerical or alphabetical order, where the data-information within respective elements constitutes the difference in data-information in relation to the data-information within the preceding element in the hierarchy. The data-information within the root-element constitutes a start-value. This start-value is the actual data-information, and the differential information within the remaining elements is made up of a data-word that represents the actual difference of the data-information in relation to the data-information belonging to the preceding element, regardless of where the difference is within the data-information.

19 Claims, 3 Drawing Sheets

STRUCTURE FOR A DATABASE

FIELD OF INVENTION

The present invention relates to a structure for the storage of data-information within a data-base.

The structure is suitable where data-information is structured in a node hierarchy that comprises a B-tree. This tree includes root-node, possibly one or more levels of intermediate nodes, and one or more leaf-nodes.

The root-node includes a root-element, respective intermediate nodes include one or more intermediate elements, and respective leaf-nodes include one or more leaf-elements.

The B-tree is built-up by linking a first intermediate element within an intermediate node to the root-element or to an intermediate element within an intermediate node placed at a higher level in the hierarchy. Remaining intermediate elements within the intermediate node are linked to the first intermediate element.

Similarly, a first leaf-element within respective leaf-nodes is linked either to the root-element or to an intermediate element of one of the intermediate nodes. Remaining leaf-elements in a leaf-node are linked to the first leaf-element.

Respective elements include address-information for the links and data-information.

The order of the elements within a node is a logical order with respect to data-information, such as an alphabetical or numerical order.

The data-information in respective elements constitutes the difference in data-information in relation to the data-information belonging to preceding elements in the hierarchy.

BACKGROUND OF THE INVENTION

It has long been known to use different data structures to store data within a data-base. These structures afford various advantages with respect to used storage space and the possibility of fast-searching, for instance.

A known structure is based on a B-tree, thereby enabling the logical distribution of elements in a table within a data-base.

An element may include an internal address in a data-base that is coupled to an external key, such as a telephone number, for instance. When inserting a new telephone number in a table, a calculation is made as to the element in which the internal address of the telephone number shall be placed, by means of a logic order.

The function of the B-tree is to distribute the addresses in the table, so that said addresses are distributed in a manner which will enable them to be easily found.

The B-tree is used essentially to create an ordered and simple structure.

Each tree commences with a root-node which points to further nodes in which a search for a desired node can be carried out on the basis of certain criteria. These nodes will often include a key or an index.

Http addresses, file names, time stamps, telephone numbers, etc., are examples of keys stored in a B-tree.

It should also be mentioned that the aforesaid nodes are nodes in a tree-structure intended to describe an hierarchy of stored keys or indexes, and not processor nodes in a distributed data-base.

It is also known in the case of logically sequential data sets to store solely the difference information between two mutually sequential data sets.

This procedure is used, for instance, in image processing where a large quantity of information is required to store and reproduce moving pictures or images, but where the difference between two mutually sequential images may be very small, and consequently only the difference between these images is stored and utilised when reproducing the images.

It is also known to store solely the difference between two interlinked elements instead of storing the entire element, in conjunction with linked lists.

This requires less storage space, but provides the same information.

It should also be mentioned that in conjunction with file names or http addresses for instance, different formats and suffixes are used which can make it difficult to describe the difference information between two adjacent nodes in a simple manner.

The following publications describe the handling of information structured in a B-tree. "Transaction Processing: Concepts and Techniques", J. Gray, A. Reuter, Morgan Kaufman, 1993.

"Prefix B-trees", R. Bayer, K. Unterauer, ACM Trans. on Data-base Systems, Vol. 2, No. 1, pp. 11–26, 1977.

It should also be mentioned that it is known to store different elements in a so-called container, where the elements lie consecutively one after the other, and where a container can be treated as a unit.

SUMMARY OF THE INVENTION

Technical Problems

When considering the state of the prior art as described above, it will be seen that a technical problem resides in providing a structure for the storage of data-information in a data-base which requires far less storage space than that required with known structures, even with respect to known compression, by storing solely difference information in relation to preceding nodes.

Another technical problem resides in the provision of a compression structure that will also enable a desired element or object to be found effectively.

Another technical problem resides in the ability to provide a structure in which a data-word is able to describe the occurrent differences in an unequivocal and simple fashion.

Yet another technical problem resides in providing a structure for a data-word which handles different suffixes of the data-information to be stored in a simple fashion.

Another technical problem resides in enabling a difference between two sets of data-information to be easily represented, where said difference does not lie at the end of the data-information, to be readily represented without needing to represent those similarities that are found after this difference in data-information.

Another technical problem resides in the ability to handle changes of elements or objects in a compressed B-tree.

Yet another technical problem is one of enabling elements or objects in a compressed B-tree to be copied.

Another technical problem is one of accelerating the search of a B-tree when seeking a specific element.

Another technical problem is one of providing a structure in which compression of data-information provides the possibility of substantially speeding-up the search of a B-tree when seeking a specific element.

Still another technical problem is one of providing a structure which will enable elements to be inserted in and removed from a B-tree simply and effectively, where the data-information is compressed and includes solely difference information relating to preceding nodes.

Another technical problem is one of providing a structure whereby a node that includes a plurality of elements is available by a read-in to the cache memory.

Another technical problem is one of providing a structure in which the amount of address information required with references between different nodes and elements included therein is much less than that required traditionally.

Solution

With the intention of solving one or more of the aforesaid technical problems and with a starting point from a structure of the kind described in the introduction, it is proposed in accordance with the invention that the data-information within the root-element constitutes a start-value and that this start-value constitutes the actual data-information. It is also proposed that the differential information within remaining elements is comprised of a data-word that represents the actual difference in the data-information in relation to data-information belonging to preceding elements, regardless of where the difference is within the data-information.

Since only the actual difference is stored, regardless of whether this difference is at the end or not, a highly compressed structure is obtained.

According to one embodiment of the present invention, such a structure is created by allowing the differential-information to include a directive as to whether something shall be removed relative to the data-information belonging to preceding element and, if so, the nature of what shall be removed and from where in the data-information it shall be removed, and to allow the differential-information to include a directive as to whether something shall be added relative to the data-information belonging to preceding element and, if so, the nature of what shall be added and the place within said data-information in which this addition shall be made.

With the intention of providing a compressed or compacted way of expressing this differential-information, it is proposed in accordance with the present invention that a data-word will include a header and an information part, where the header reveals how the information part shall be interpreted.

It is also proposed that the information part can include five different groups of bits, where

- a first group which is referred to as a suffix in this document and which represents the type of suffix belonging to the data-information;
- a second group which is referred to as minus information in this document and which represents the number of bytes that shall be removed in relation to preceding element;
- a third group which is referred to as plus information in this document and which represents the number of bytes that shall be added in relation to preceding element;
- a fourth group which is referred to as a similarity in this document and which represents the number of bytes from the end, apart from the suffix, that are similar in relation to preceding element; and
- a fifth group which is designated difference in this document and which constitutes the characters that shall be added, i.e. the plus information, in clear text.

In order to enable the aforesaid groups to be interpreted correctly, it is proposed that the header is comprised of three bits, where

- a first bit shows whether the fourth group exists or not, i.e. whether the difference lies at the end of the data-information or not;
- a second bit reveals whether or not the second and the third group include four or eight bits; and
- a third bit which reveals whether the second, the third and the fifth groups exist or not, i.e. whether or not any differential-information is found in addition to the suffix.

Thus, there is provided a structure in which the first group includes five bits, the second and third groups include four or eight bits, the fourth group includes zero or eight bits, and the fifth group includes the number of bytes necessary to represent anything that shall be added in relation to preceding element.

Consequently, with the exception of the fifth group, all differential-information can be represented by at least eight bits, i.e. by one byte, when a difference exists only in the suffix, or at the most thirty-two bits, i.e. four bytes when all groups include the maximum number of bits.

One to four bytes plus the actual difference, when this is comprised of plus information, is a significant compression in relation to known techniques. This amount of information requires memory space that corresponds to about 20% of the memory space required with no compression.

Through the medium of its five bits, the first group is able to represent thirty-two different suffixes according to a pre-determined list of suffixes, which enables a large number of suffixes to be handled, where each suffix can be represented by only five bits.

The data-information in respective leaf-elements also includes the object sought for.

With the intention of handling locking of objects when an object is the subject of a transaction, it is proposed in accordance with the invention that respective objects include four different bit-combinations, where a first bit-combination represents whether the object is locked or not.

When the first bit-combination shows that an object is unlocked, a second bit-combination constitutes object status bits, a third bit-combination includes information concerning the length of an object key belonging to an object, and a fourth bit-combination includes the object key.

When the first bit-combination shows that the object is locked, the bits belonging to remaining bit-combinations represent a reference to a transaction register. This transaction register includes the object status bits, information concerning the length of an object key belonging to said object, the object key itself, an information concerning the type of lock that has been applied to the object.

The status bits are utilised in object copying processes, where respective bits indicate whether or not the object has been copied. A plurality of simultaneous copying processes each utilize a respective status bit.

With the intention of enabling an element to be removed from a B-tree, it is proposed in accordance with the invention that the differential information belonging to a possible following element is adapted to constitute differential information in relation to an element that precedes the removed element, and that the address information belonging to a following element is adapted to point to the preceding element, and that the address information belonging to the preceding element is adapted to point to the following element.

Similarly, when adding an element, it is proposed that the differential information belonging to the added element is adapted to constitute differential information in relation to a preceding element, that the address information belonging to the added element is adapted to point to the preceding element and to any following element, that the differential information belonging to said possible following element is adapted to constitute differential information in relation to the added element, that the address information belonging to said following element is adapted to point to the added element, and that the address information belonging to the preceding element is adapted to point to the added element.

With the intention of accelerating search possibilities in a B-tree, it is proposed in accordance with the invention that one node is comprised of a container and that respective elements belonging to a node are allocated positions immediately behind one another in said container.

Moreover, the amount of information in a container is adapted to be less than, or equal to, the amount of information that can be read to a cash memory belonging to a processor active within the data-base or utilising the data-base, in one access.

The limitation in the size of a container enables the flexibility afforded by a B-tree to be retained when storing said information in a memory.

Despite this size limitation, a container is able to contain a relatively large number of elements, due to the comprehensive compression of respective elements.

Thus, when a memory is accessed, a plurality of elements are read into the cache memory at one and the same time. In the case of a normal linked list, it is very often necessary to access the memory for each element that is read-in.

Moreover, consecutive storage of the elements in a container requires fewer pointers than required in a linked list, therewith allowing further compression of necessary space.

The possibility of utilizing the least possible address information is to place the nodes of the tree-structure on a common page to the greatest possible extent, since references in one page require considerably less address information than references to other pages.

Advantages

One of the primary advantages afforded by an inventive structure is that any differences whatsoever between two adjacent nodes or elements can be represented. When ignoring necessary address information, the storage space required when practicing this method can be reduced to about 20% of the storage space required for a non-compressed B-tree.

Another advantage afforded by the present invention is that a B-tree can be searched with relatively few accesses to the memory or memories in which the information is stored.

An inventive tree-structure thus enables optimization (minimization) of necessary address storage space in a data structure that is based on linked lists, where the storage structure is an ordered structure that offers a logical, relatively fast search possibility through the linked list.

All in all, the invention provides effective handling through the medium of better compression of data than was earlier the case and through a greater possibility of rearranging on one page in conjunction with adding an element to or removing an element from the tree. These rearrangement possibilities are afforded by the fact that each container can be read into the cache memory through one access and handled within the cache memory, which is a very fast and effective handling procedure.

The primary characteristic features of an inventive structure are set forth in the characterizing clause of the following claim 1.

BRIEF DESCRIPTION OF THE DRAWINGS

So that the invention will be more readily understood and other features thereof made apparent, an inventive structure will now be described with reference to exemplifying embodiments and also with reference to the accompanying drawings, in which.

DETAILED DESCRIPTION OF PREFERRED EMBODIMENTS

So that the present invention will be more readily understood, a trees-structure intended for use in storing data-information will now be described while using the terminology that will later be used to describe the present invention.

A tree-structure represents a method of establishing a linked list in the form of a tree, so as to simplify and make more effective the search for a given element in the list.

Figure 1:
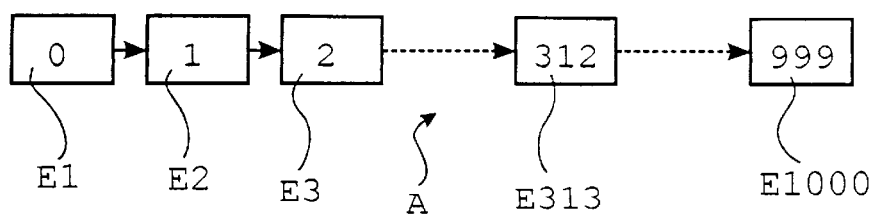
FIG. 1 is a schematic and highly simplified illustration of a linked list of elements according to known technology.

In order to simplify the description of a B-tree, we use an example in which 1000 elements are numbered from 0 to 999. These elements can be placed in a normal linked list A according to FIG. 1, or in a tree B according to FIG. 2, where a number of elements E1, E2, E3, . . . have been distributed in a tree-structure in number order from 0 to 999.

When searching for elements "312" E313 in a normal link list A, the search is commenced in element "0" E1 which links the search further to element "1"E2, and so on until element "312", E313 is reached. This results in 312 searches, not including the search for the first element "0"E1.

Figure 2:
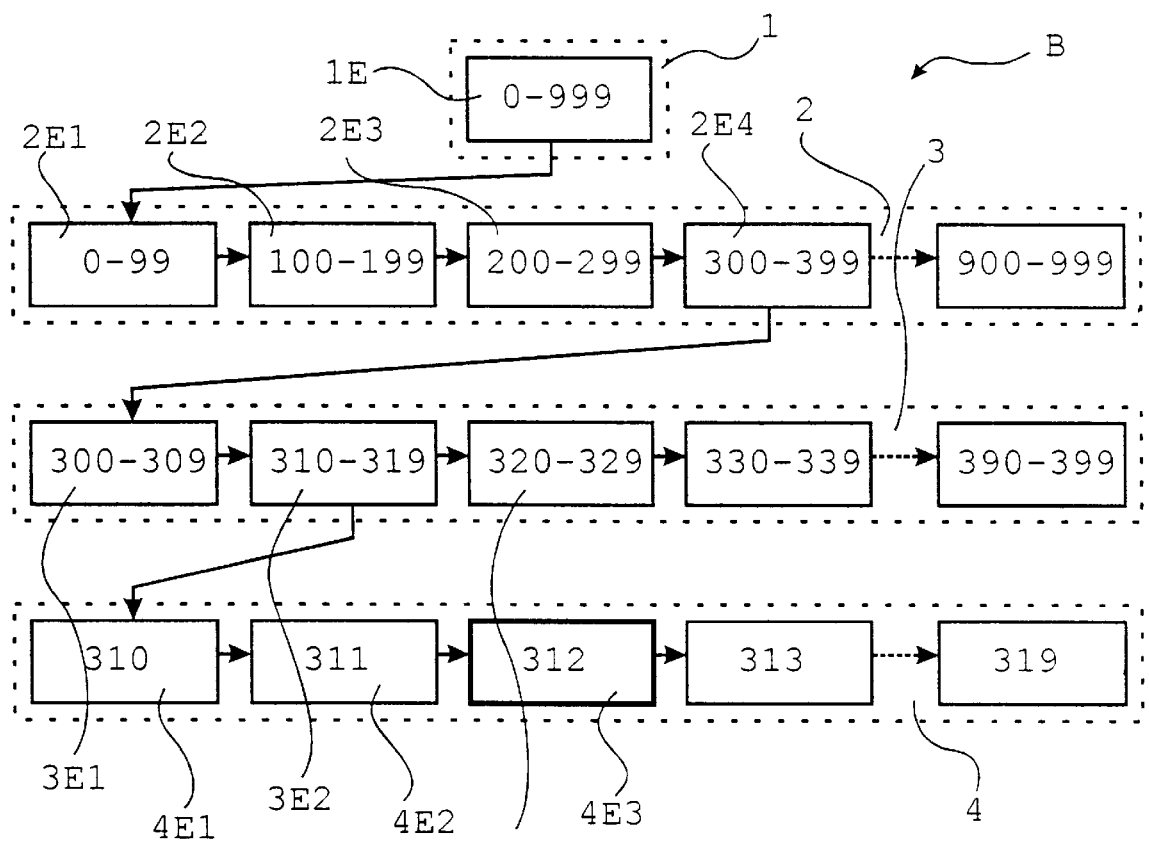
FIG. 2 illustrates part of a linked list according to FIG. 1 structured in accordance with a tree-structure in a known manner.

The tree-structure illustrated in FIG. 2 enables the same element to be found by fewer searches.

The illustrated tree has a root-node 1 which includes a root-element 1E that has the value "0–999". This element links to a first intermediate node 2 that includes a plurality of elements 2E1, 2E2, 2E3, . . . Each of these elements links to a further intermediate node which includes further elements. FIG. 2 shows how element "300–399" 2E4 link to an intermediate node3.

The elements 3E1, 3E2, 3E3, . . . in the intermediate node 3 link, in turn, further to a leaf-nodes that includes a plurality of leaf-elements. FIG. 2 shows how the leaf-element "310–319" 3E2 link further to a leaf-nodes 4 that includes a plurality of leaf-elements 4E1, 4E2, 4E3, . . .

The leaf-elements contain the actual information being sought.

In our example, the search is for element "312" 4E3, which in the illustrated tree-structure is carried as follows.

Firstly, a search is made through the elements 2E1, 2E2, 2E3, . . . in the first intermediate node 2 until the element "300–399" 2E4 is found, which requires four searches.

A search is then made through the second intermediate node 3 until the element "310–319" 3E2 is found, which requires two searches.

Finally, a search is made through the leaf-elements 4E1, 4E2, 4E3, . . . until the sought element "312" 4E3 is found, which requires three searches.

This results in a total of nine searches, not including the search for the root-element "0–999" 1E, as opposed to 312 searches in the case of a normal linked list A.

In the case of the normal linked list A, a search for element "999" E1000 requires 1,000 searches, whereas only 30 searches are required in the B-tree B. On the other hand, the elements "0" to "9" are found more quickly in the normal linked list A, since two additional searches are required in the B-tree to come down to the leaf-elements.

It is also known in conjunction with linked lists to store solely the difference between two interlinked elements instead of the whole element.

Thus, in the FIG. 2 example, the root-element 1E might contain data-information "0", all elements in the first intermediate node 2 might then contain data-information "+100", which is the difference in respect of preceding elements, all elements in the second intermediate node 3 might, similarly, contain data-information "+10", and the leaf-elements in the leaf-nodes 4 might contain data-information "+1".

This requires less storage space, but provides the same information.

It is not always that information can be stored as sorted in the simple manner shown in the above example.

For instance, the data-information is a more complex data structure in the case of file names or http addresses. Moreover, different formats and suffixes are used, which may make it difficult to describe the differential information between two adjacent nodes in a simple manner.

The following linked http addresses are given by way of example in this respect:

1) www.ericsson.se/ndb/description.html
2) www.ericsson.se/ndb/nodedescription.html
3) www.ericsson.se/ndb/system$_{13}$arch.pdf
4) www.ericsson.se/ndb/system$_{13}$arch.ps In this case, the information for 2, 3 and 4 requires 128 bytes. This can be described in a compressed form with a starting point from a starting value, which becomes address number 1. In a method in which the difference to preceding elements is stored, it is possible to represent the above addresses in the following way:

1) www.ericsson.se/ndb/description.html
2) –"description.html"+"nodedescription.html"
3) –"nodedescription.html"+"system_arch.pdf"
4) –"df"+"s"

which requires 80 bytes for 2, 3 and 4 and is thus a compression of the data-information that must be stored in order to reproduce desired information. This corresponds to about 60% of the storage space required in the absence of any compression.

The invention essentially builds on a method which is based on solely storing in respective elements the difference to preceding elements in a B-tree, this method enabling the data-information required in a tree-structure to be further compressed or reduced, in relation to known techniques.

This method provides the possibility of creating differential information between two adjacent elements without needing to store all of the end of the data-information, provided that the difference does not lie at the end of the element.

In the above example, the difference between the start-value (1) and the following element (2) is found in a number of characters from the end of the data-information.

This means that the differential information is larger than necessary –"description.html"+"nodedescription.html", since the actual difference between the data-information in the two elements is relatively small in practice, +"node".

It is proposed in accordance with the present invention that the differential information in the various elements is comprised of a data-word that represents the actual difference in the data-information relative to the data-information belonging to preceding element, regardless of where the difference lies in the data-information.

This differential information includes a directive as to whether something shall be removed from the data-information belonging to a preceding element and, if such is the case, the nature of what shall be removed and from where in the data-information it shall be removed.

The differential information may also include a directive that something shall be added to the data-information belonging to a preceding element, and, in such case, what shall be added and where in the data-information the addition shall be made.

Figure 3:
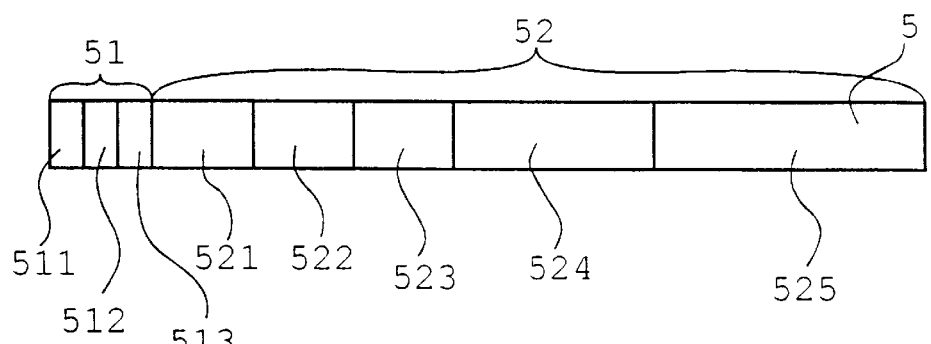
FIG. 3 illustrates schematically how a data-word intended to represent the differential information between two adjacent elements is structured in accordance with the present invention.

FIG. 3 is intended to show the construction of a data-word. In the illustrated case, a data-word 5 includes a header 51 and an information part 52, where the header 51 discloses how the information part 52 shall be interpreted.

The information part 52 may include five different groups of bits, where a first group 521, here designated suffix, represents the type of suffix contained in the data-information;

a second group 522, here designated minus information, which represents the number of bytes that shall be removed relative to a preceding element;

a third group 523, here designated plus information, representing the number of bytes that shall be added to a preceding element;

a fourth group 524, here designated similarity, which represents the number of bytes from the end that are similar to a preceding element, disregarding the suffix; and a fifth group 525, here designated difference, which constitutes the characters that shall be added, i.e. the plus information 523 in clear text.

The header 51 is comprised of three bits, where a first bit 511 discloses whether the fourth group 524 exists or not, i.e. whether the difference lies at the end of the data-information or not;

a second bit 512 which discloses whether the second and third groups 522, 523 include four or eight bits; and a third bit 513 which discloses whether the second, third and fifth groups 522, 523, 525 exist or not, i.e. whether or not any differential information is found with the exception of the suffix 521.

The first group 521 includes five bits, the second and third groups 522, 523 include four or eight bits, the fourth group 524 includes zero or eight bits, and the fifth group 525 includes the number of bytes necessary to represent what shall possibly be added.

Thus, with the exception of the fifth group 525, all differential information can be represented by at least eight bits, that is to say one byte, when a difference lies solely in the suffix, or at most thirty-two bits, that is to say four bytes, when all groups include the maximum number of bits.

Through the medium of its five bits, the first group 521 is able to represent thirty-two different suffixes according to a predetermined suffix list.

For instance, the suffix "html" can be allocated the value "00000" and the suffix "pdf" can be allocated the value "00001". Thus, respective suffixes are represented by 5 bits in both cases. On the other hand, if written-out the suffix "html" requires four bytes, 32 bits, and "pdf" requires three bytes, 24 bits.

To exemplify this, we return to the example of linked http addresses:

1) www.ericsson.se/ndb/description.html
2) www.ericsson.se/ndb/nodedescription.html
3) www.ericsson.se/ndb/system$_{13}$arch.pdf
4) www.ericsson.se/ndb/system$_{13}$arch.ps According to the present invention, this can be described in a further compressed form than can be achieved by known techniques, such as:

1) www.ericsson.se/ndb/description.html
2) The header 51: 101 (3 bits); suffix 521: html (5 bits); minus information 522: −0 (4 bits); plus information 523: 4 (4 bits); similarity in the end 524: 11(8 bits); difference 525: "node" (4 bytes)
3) The header 51: 001 (3 bits); suffix 521: pdf (5 bits); minus information 522: −15 (4 bits); plus information 523: +11 (4 bits); difference 525: "system$_{13}$arch" (11 bytes)
4) The header 52: 000 (3 bits) suffix 521: ps (bits)

which results in 21 bytes for rows 2, 3 and 4 as opposed to 80 bytes needed for compression in accordance with known techniques, and 128 bytes in respect of non-compressed information.

To this information, there must be added the address information required to maintain the tree-structure and to enable a search to be made through said structure.

Data-information belonging to respective leaf-elements also includes the actual object, for instance the internal representation for the external http address that a user sees, a so-called object key.

An element can be affected by a transaction in different ways, for instance by a change or updating of the object. In the case of certain changes, it is necessary to lock the element, or the object, against other transactions. Different types of locks can be used, depending on the extent to which the object can be made available for other transactions.

Figure 4:
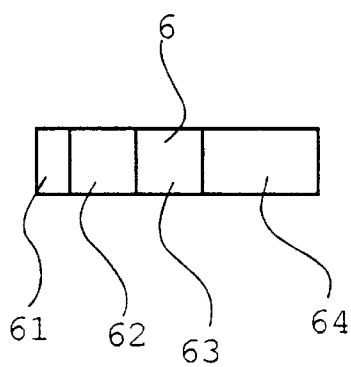
FIG. 4 is a schematic illustration of the construction of a non-locked object.

According to the present invention, an object 6 includes four different bit combinations, shown in FIG. 4.

A first bit combination 61 in the object 6 reveals whether the object is locked or not.

When the first bit combination 61 reveals that the object 6 is not locked, a second bit combination 62 includes object status bits, a third bit combination 63 includes information concerning the length of an object key belonging to said object, and a fourth bit combination 64 includes the actual object key.

Figure 5:
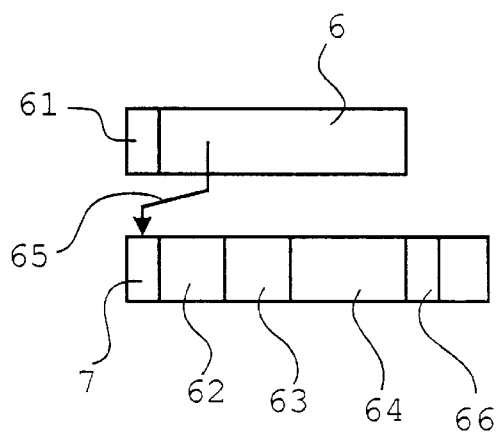
FIG. 5 is a schematic illustration of a locked object.

When the first bit combination 61 reveals that the object is locked, the bits belonging to remaining bit combinations represent a reference 65 to a transaction register 7 belonging to the transaction that has caused the lock to be applied, in accordance with FIG. 5.

This transaction register 7 includes object status bits 62, information 63 concerning the length of the object key, the object key 64 itself, and information 66 concerning the type of lock that has been applied to the object 6.

The status bits 62 are used in object copying processes, in that respective bits indicate whether the object has been copied or not. Each of a number of simultaneous copying processes utilize its respective status bit, whereby the object is available for copying by as many different copying processes as there are status bits.

Figure 6:
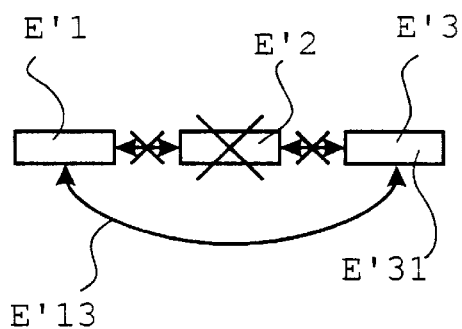
FIG. 6 illustrates schematically how an element can be removed from a tree-structure.

FIG. 6 is intended to show how an element E'2 is removed in accordance with the present invention. FIG. 6 shows that a differential information E'31 belonging to a possible following element E'3 is adapted to constitute difference information in relation to an element E'1 preceding the removed element E'2.

Any address information E'13 belonging to the following element E'3 shall also be adapted to point to the preceding element E'1, and the address information E'13 belonging to the preceding element E'1 shall be adapted to point to the following element E'3.

Figure 7:
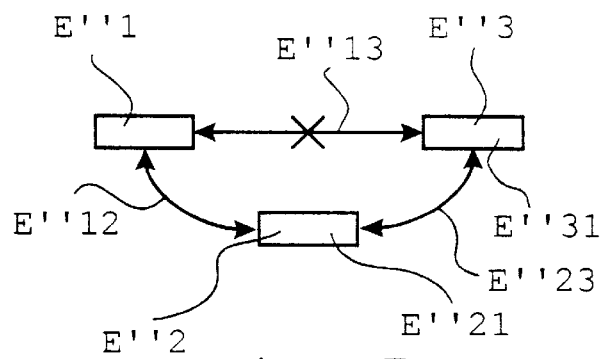
FIG. 7 illustrates schematically how an element can be added to a tree-structure.

FIG. 7 illustrates in a similar manner that when adding an element E"2, the differential information E"21 belonging to the added element E"2 is adapted to constitute differential information in relation to a preceding element E"1.

The differential information E"31 belonging to a possible following element E is three shall then be adapted to constitute differential information in relation to the added element E"2.

Any address information E"12, E"23 belonging to the added element E"2 is adapted to point to the preceding element E"1 and the following element E"3, the address information E"23 of any following element E"3 is adapted to point to the added element E"2, and the address information E"12 belonging to the preceding element E"1 is adapted to point to the added element E"2.

In the above description, the elements within a node are interlinked in a linked list. This means that a search through these elements may require access to a memory for each element.

Since the aforedescribed compression structure provides significant compression of necessary memory space, the structure enables a plurality of elements to be stored in a common container.

Figure 8:
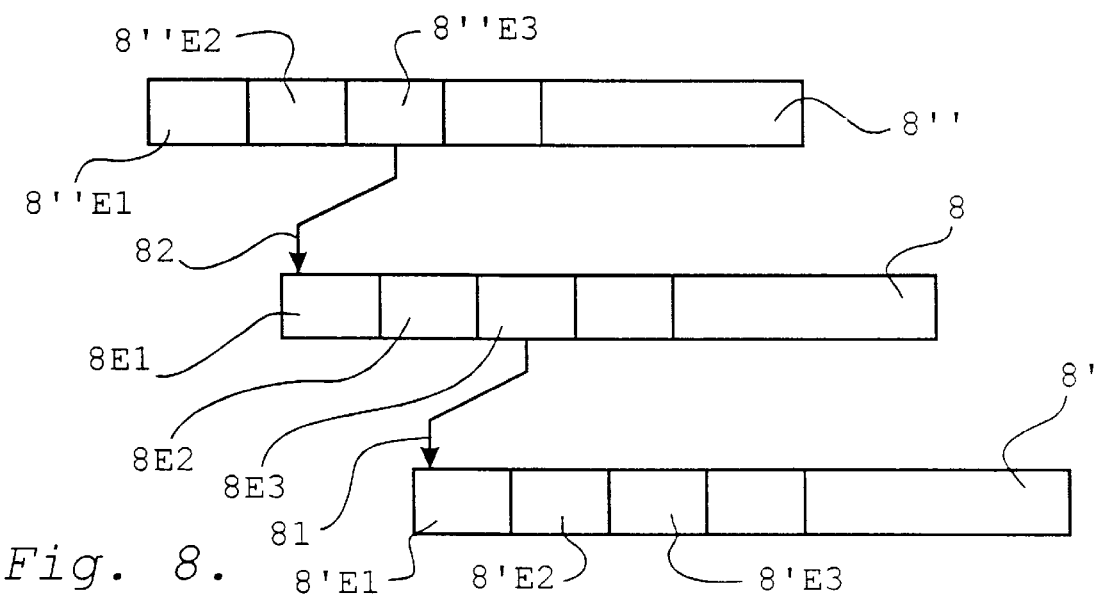
FIG. 8 illustrates an alternative embodiment in which the elements belonging to a node are collected in a container.

FIG. 8 illustrates a preferred embodiment of the present invention where respective nodes are comprised of a container 8.

Respective elements 8E1, 8E2, 8E3, . . . belonging to a node are allocated positions immediately after one another in the container 8.

With the intention of making the search possibilities through an inventive tree-structure still more effective, it is proposed that the amount of information contained in a container 8 is less than, or equal to, the amount of information that can be read through one read-in to a cache memory belonging to a processor that operates in the data-base or utilises said data-base.

Because the elements 8E1, 8E2, 8E3, . . . in a container 8 lie consecutively one after the other, it is not necessary for respective elements to include all the address information required in a linked list.

Thus, when the elements 8El, 8E2, 8E3, . . . are contained in a container, it is proposed in accordance with the invention that the links and associated address information found within respective intermediate elements 8E1, 8E2, 8E3, . . . are limited to one link 81 and associated address information concerning a first element 8'E1 belonging to a following node 8' in the hierarchy, and one link 82 and associated address information from respective first intermediate elements 8E1 to an element 8"E3 in a preceding node and associated container 8" in the hierarchy.

As similarly, links and associated address information within respective leaf-elements 8'E1, 8'E2, 8'E3, . . . are limited to a link 81 and associated address information from respective first leaf-elements 8'E1 to an element 8E3 in a preceding node and associated container 8 in the hierarchy.

Different quantities of address information are required when addressing within a table, this quantity depending on how the various nodes are placed. If a node on another page is to be addressed, the addressing procedure may require up to eight bytes in the worst of cases.

The pages can be given different sizes and are adapted to different data structure.

In one preferred embodiment of the present invention, the tree nodes are placed on one and the same page as far as possible.

This makes it easier to refer to another node. According to the present invention, a container is given a specific size which is adapted to enable its contents to be read into a cache memory through one access.

Present-day processors are normally able to read 128 bytes into the cache memory at a time, and the following description is based on this value. It will be understood, however, that the size of a container and other dimensions mentioned in the following description shall be adapted to the amount of information that can be read into the cache memory of the processors concerned at any one time, in order to obtain the desired effect.

Another parameter that may need to be taken into account in future applications of the present invention is the time taken to process the information read into the cache memory. When the process time exceeds the time for a cache-miss, it is suitable to limit the size of a container, and other dimensions, to a value at which the time taken to process a container is shorter than the time taken for a cache-miss regardless of the amount of information that can be read into the cache memory at a time.

When wishing to address all containers that obtain room on one page with an adapted small amount of address information, it is proposed in accordance with the invention that one page is adapted to at least accommodate the number of containers that can be addressed with the aid of one byte. 256 containers can be addressed with one byte, which corresponds to 32,768 bytes. Thus, one page shall be adapted to be able to include at least 33 Kbytes and other necessary information belonging to one page.

Figure 9:
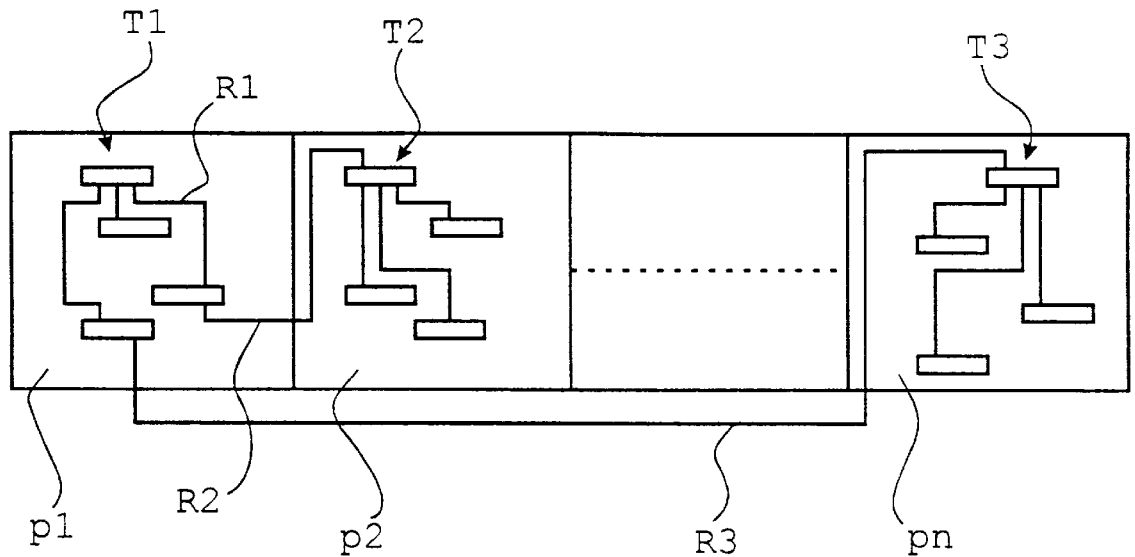
FIG. 9 illustrates schematically how a tree can be divided into a number of smaller sub-trees.

FIG. 9 shows schematically how a B-tree has been divided into a number of smaller part-trees T1, T2, T3. This enables a tree which is too large to be accommodated on one page to be divided into smaller part-trees.

Where a part-tree T1 is accommodated on one page p1, the necessary address information R1 requires only one byte per reference. When the references R2, R3 are between the part-trees T1, T2, T3, a larger quantity of address information is required, namely the quantity of information required to address containers on different pages p1, p2, . . . , pn.

Thus, the majority of references in the total tree can be accommodated within one byte each. Solely those references between the part-trees require a larger memory space.

One method of searching through a B-tree in accordance with the present invention will now be described by way of example.

Figure 10:
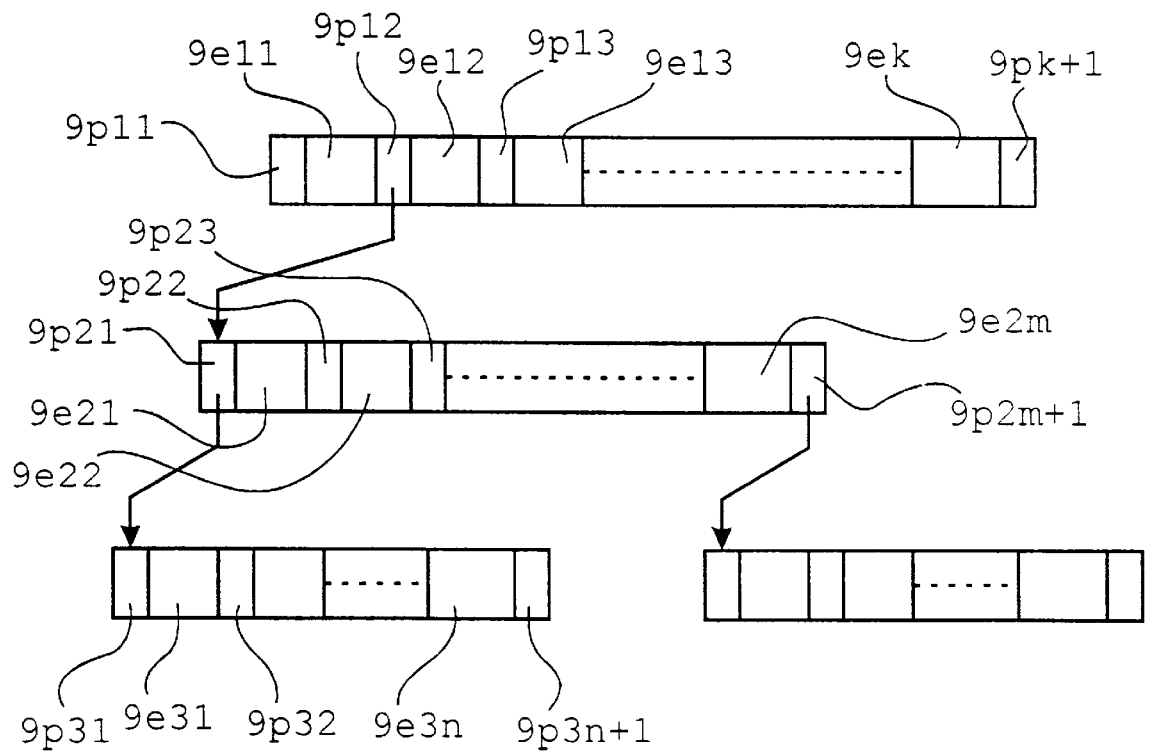
FIG. 10 is a schematic illustration of a B-tree and shows how a search through a B-tree can be performed.

FIG. 10 is a schematic illustration of a tree. A search begins from a so-called root-page and continues downwards. Since the elements of the B-tree contain solely differential information, it is necessary to have a start-value at all search levels. The actual object that is stored can be found by utilizing the start-value and the differential information. The root-node on the root-page contains the start-value "NULL".

The desired object is compared with a first element $9e11$. If the object is smaller than or equal to the element $9e11$, the search follows the left pointer $9p11$, otherwise there follows a comparison with the next element $9e12$. If the object is smaller than or equal to this element $9e12$, the search follows the left pointer $9p12$, which is the case in our example.

The start-value for the node to which the pointer $9p12$ points is then the element $9e12$, since all elements within this node are greater than the element $9e12$. The search continues in this way, down through the nodes on one page.

If the search passes to another page, this page will have the same start-value as the root-node as though the search had continued through the tree without paying attention to the pages. It will be evident from the above that the start-value is known implicitly throughout the entire search. Thus, it is not necessary to store the start-values in conjunction with searches.

If an object cannot be accommodated in a container, a further container is allocated and combined with the first container, thus forming a larger container that has the necessary space.

This container is then too large for its contents to be read into a cache memory on one and the same occasion, which results in a cache-miss in conjunction with a search for certain elements within this container. This provides a functionality which, however, is paid for by a loss in performance.

It will be understood that the invention is not restricted to the aforedescribed and illustrated exemplifying embodiments thereof and that modifications and variations can be made within the scope of the inventive concept as illustrated in the following claims.

What is claimed is:

1. A method for storing data-information within a computer data-base, comprising the steps of: structuring the data-information in a node hierarchy which is comprised of a tree-structure that includes a root-node, one or more levels of intermediate nodes, and one or more leaf-nodes, wherein the root-node includes one or more root-elements, respective intermediate nodes include one or more intermediate elements, and respective leaf-nodes include one or more leaf-elements; linking a first intermediate element within an intermediate node to the root-element or to an intermediate element within an intermediate node placed at a higher level in the hierarchy, and wherein remaining intermediate elements within the intermediate node are linked to said first intermediate element, wherein a first leaf-element within respective leaf-nodes is linked either to the root-element or to an intermediate element of one of the intermediate nodes and remaining leaf-elements in a leaf-nodes are linked to the first leaf-element, wherein respective elements include address-information for the links and the data-information; ordering the elements within a node in a logical order with respect to the data-information, and where the data-information in respective elements constitutes the difference in data-information in relation to the data-information belonging to preceding element in the hierarchy, wherein the data information within said root-element constitutes a start value; in that said start-value is comprised of the actual data-information; in that differential information within remaining elements is comprised of a data-word that represents the actual difference of the data-information in relation to the data-information that belongs to the preceding element, regardless of where the difference lies within said data information.

2. The method according to claim 1, wherein said differential information includes information as to whether something shall be removed relative to the data-information belonging to the preceding element and, in such case, what shall be removed and from where within said data-information it shall be removed; and in that said differential information includes a directive as to whether something shall be added relative to the data-information belonging to the preceding element and, in such case, what shall be added and where within said data-information the addition shall be made.

3. The method according to claim 2, wherein said data-word includes a header and an information part; and in that said header reveals how said information part shall be interpreted.

4. The method according to claim 3, wherein said information part may include five different groups of bits, wherein a first group, here designated suffix, represents the type of suffix possessed by said data-information;

a second group, here designated minus information, which represents the number of bytes that shall be removed relative to the preceding element;

a third group, here designated plus information, which represents the number of bytes that shall be added in relation to the preceding element;

a fourth group, here designated similarity, which represents the number of bytes from the end that have similarity in relation to the preceding element, apart from said suffix; and a fifth group, here designated difference, which constitutes the characters that shall be added to the data-information, in clear text.

5. The method according to claim 4, wherein said header is comprised of three bits, wherein a first bit reveals whether or not the fourth group exists, which determines whether or not the difference lies at the end of said data-information;

a second bit reveals whether said second and third groups include four or eight bits; and wherein a third bit reveals whether or not said second, third and fourth groups exists, which correlates to whether or not differential information exists apart from said suffix.

6. The method according to claim 5, wherein said first group includes five bits; in that said second and third groups include four or eight bits; in that said fourth group includes zero or eight bits; and in that said fifth group includes the necessary number of bytes.

7. The method according to claim 6, wherein said first group is able to represent thirty-two different suffixes in accordance with a predetermined list of suffixes, through the medium of its five bits.

8. The method according to claim 1, wherein for respective leaf-elements said data-information includes a sought object; in that said object includes four different bit-combinations where a first bit combination represents whether the object is locked or not.

9. The method according to claim 8, wherein when said first bit combination shows that said object is not locked, a second bit combination includes object status bits, a third bit combination includes information concerning the length of an object key belonging to said object, and a fourth bit combination includes said object key.

10. The method according to claim 9, wherein said status bits are used in object copying processes; in that respective bits indicate whether the object has been copied or not; and in that a plurality of simultaneous copying processes each utilizes a respective status bit.

11. The method according to claim 8, wherein when said first bit combination reveals that said object is locked, the bits belonging to remaining bit combinations represent a reference to a transaction register; in that said transaction register includes object status bits, information concerning the length of an object key belonging to said object, said object key itself, and information concerning the type of lock that has been applied to said object.

12. The method according to claim 11, wherein said status bits are used in object copying processes; in that respective bits indicate whether the object has been copied or not; and in that a plurality of simultaneous copying processes each utilize a respective status bit.

13. The method according to claim 1, wherein when removing an element, the differential information belonging to a possible following element is adapted to constitute differential information relative to an element that precedes the removed element; in that the address information belonging to said following element is adapted to point to said preceding element; and in that the address information belonging to said preceding element is adapted to point to said following element.

14. The method according to claim 1, wherein when adding an element, the differential information belonging to said added element is adapted to constitute differential information relative to a preceding element; in that the address information belonging to said added element is adapted to point to said preceding element and a possible following element; in that differential information belonging to said possible following element is adapted to constitute differential information relative to said added element; in that the address information belonging to said following element is adapted to point to said added element; and in that address information belonging to said preceding element is adapted to point to said added element.

15. The method according to claim 14, wherein one page is adapted to accommodate a plurality of nodes that can be addressed by means of one byte; in that a tree-structure is divided into a plurality of part-trees where respective part-trees are included by one page; in that address information belonging to respective references between two nodes within a common part-tree is comprised of one byte; and in that the address information belonging to respective references between two different part-trees is comprised of the memory space necessary therefor.

16. The method according to claim 1, wherein a node is comprised of a container; and in that respective elements belonging to a node are allocated immediately sequential positions within said container.

17. The method according to claim 16, wherein a container contains less information than, or the same amount of information as that amount of information that can be read into a cache memory belonging to a processor acting within said data-base or using said data-base, at one and the same time.

18. The method according to claim 17, wherein said links and associated address information within respective intermediate elements are limited to a link and its associated address information concerning a first element belonging to a following node in said hierarchy; and in that said links and their associated address information within respective leaf-elements are limited to one link and its associated address information from respective first leaf-elements to an element belonging to a preceding node in said hierarchy.

19. The method according to claim 16, wherein said links and associated address information within respective intermediate elements are limited to a link and its associated address information concerning a first element belonging to a following node in said hierarchy; and in that said links and their associated address information within respective leaf-elements are limited to one link and its associated address information from respective first leaf-elements to an element belonging to a preceding node in said hierarchy.

* * * * *